United States Patent Office 3,362,872

Patented Jan. 9, 1968

3,362,872

METHOD FOR COMBATING MICROORGANISMS

Arleen C. Pierce, Belleville, N.J., assignor to Allied Chemical Corporation, New York, N.Y., a corporation of New York No Drawing. Filed June 13, 1966, Ser. No. 556,850
5 Claims. (Cl. 167—33)

ABSTRACT OF THE DISCLOSURE

Microorganisms, especially bacteria and particularly *Staphylococcus aureus*, are combated by treatment with an effective amount of an active compound comprising the β-lactone of 2,2,4-trimethyl-3-hydroxy-3-pentenoic acid. The active compound is a known compound and may be employed in the form of solutions, sprays, mists, dusts, or preferably in vaporous state.

The problem of combating microorganisms, meaning in the context of this discussion killing and preventing or retarding the propagation of microorganisms, is common to a number of industries such as the food, agricultural and pharmaceutical industries, and is particularly significant to the medical profession. The usual methods of sterilization such as steam, heat, chemical solution, radiation, and the like, are impractical when large areas such as hospital rooms, laboratories and animal quarters are desired to be sterilized or when it is desired to sterilize delicate laboratory and medical equipment, which may contain plastics, fabrics, and the like that may be adversely affected by moisture and heat.

The term sterilization is generally interpreted as referring to a condition in which a locus is freed from all living microorganisms as opposed to being freed only from certain microorganisms.

The problem of freeing a locus from all living microorganisms is no mean one because, although many varieties of microorganisms are relatively easy to combat, others have particularly high resistances to adverse conditions and are exceedingly difficult to combat. Such a microorganism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other microorganisms, researchers have used these cells as standards for sterilization tests. It is presumed that if a given chemical agent is effective in combating *Staphylococcus aureus* cells; it will be effective in combating other varieties of vegetative cells. The converse of this is, of course, not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., New York (1946), p. 226.) This method requires tests of disinfectant or antiseptic action to be carried out against strains of *Staphylococcus aureus*.

The problem of sterilizing large areas and of sterilizing heat- or water-sensitive materials has been alleviated by the use of antimicrobic agents in vapor phase. Effective vapor phase antimicrobic agents must be capable of being readily introduced into the vicinity of the area to be treated; of rapidly and thoroughly penetrating porous surfaces in the area; of effectively penetrating, while in vapor phase, the microorganisms to be treated; of destroying the microorganisms at normal temperatures and humidities; and of permitting ready removal by aeration. Unfortunately, many chemical agents, while possessing good antimicrobic activity, are not capable of functioning effectively in vapor phase for lack of one or more of the above-noted requirements. Bactericidal agents, for example, which have high vapor pressures and may be vaporized easily, may still not possess the penetrability properties required for effective vapor phase use.

It is a major object of this invention to provide a novel method for combating microorganisms such as bacteria, fungi and the like.

Another object of the invention is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating microorganisms, particularly bacteria, in vapor phase.

The preferred, most specific object of the invention is to provide a novel method for combating *Staphylococcus aureus* cells in vapor phase.

It has been found that the above stated objects of the invention are accomplished by treating microorganisms, particularly *Staphylococcus aureus*, cells with the β-lactone of 2,2,4-trimethyl-3-hydroxy-3-pentenoic acid, hereinafter referred to as "the subject lactone." In accordance with the preferred objects of the invention, the subject lactone may be used effectively in vapor phase.

The subject lactone is a known compound which is a liquid at room temperature and has a boiling point of 170° C. and a specific gravity of 0.946 (20/4° C.). The subject lactone is commercially available but may be prepared by the methods described by Hasek et al. in J. Org. Chem., vol. 27 (1962), pp. 60–64, one of which comprises essentially dimerizing dimethylketene in the presence of aluminum chloride.

The subject lactone may be used to treat microorganisms by contacting the microorganisms to be treated, or surfaces containing the same, in the form of solutions, sprays, mists, dusts, or in accordance with the preferred embodiment, in vaporous state. The subject lactone may be used alone or in admixture with vaporous, solid or liquid diluents such as air and water or hydrocarbon liquids, with or without any of the well-known anionic, cationic or nonionic surface-active wetting agents. Such agents include, for example, alkali metal salts of higher fatty acids, water-soluble salts of sulfated higher fatty alcohols, water-soluble aryl sulfonates, and quaternary ammonium bases such as trialkyl benzyl ammonium chloride. In the preferred vapor phase embodiment, the subject lactone may be conveniently employed such as by vaporizing it in a closed area in which the microorganism-containing surfaces to be treated are located or by using a vaporous diluent such as air which may be bubbled into the liquid lactone and then the lactone-laden air used to fumigate a closed space surrounding the microorganism-containing surfaces to be treated.

As is well known in this art, dosages of a given antimicrobic agent can vary widely depending upon the particular organism to be controlled, the area of the locus to be treated, the time in which control is desired to be established, and environmental conditions such as temperature, relative humidity, etc. In any event, a sufficient concentration of the subject lactone should be utilized in order to effectively combat the microorganisms to be treated, that is to say in order to maximize the killing of existing living bacteria and the prevention of propagation of the same in the same locus for a significant period of time. The dosages that will be required in a particular case to accomplish these ends are readily ascertainable and are thus within the skill of the art.

The subject lactone can be employed as the sole active ingredient in combating microorganisms; however, if desired, it can be combined with active materials such as other antimicrobic agents or growth inhibitors to achieve special results or with nonactive components such as perfumes, propellant aids, and the like.

The following example illustrates practice of the invention.

*Example*

One-tenth ml. portions of the β-lactone of 2,2,4-trimethyl-3-hydroxy-3-pentenoic acid were charged to one-liter flasks. Circular patches of cotton cloth, each having an area of about 2 $cm.^2$ and each impregnated with an aqueous suspension of about $5\times10^6$ *Staphylococcus aureus* cells and subsequently dried, were suspended by wires about halfway down into the flasks. The flasks were stoppered and the patches containing the bacteria were exposed to the subject lactone vapor for periods of 1, 4 and 24 hours. The exposures were conducted at room temperature (about 20–31° C.) and at 90% relative humidity. At the end of the exposure periods, the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monoleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the subject lactone test material) was calculated by comparison of the number found after testing with an assay of unexposed contaminant patches. Bacteria counts were made with a Quebec Colony counter. The average results of the above described tests are shown in the following table:

| Hours exposed: | Percent bacteria kill |
|---|---|
| 4 | >99 |
| 24 | 100 |

I claim:

1. The method for combating microorganisms which comprises treating said microorganisms with an effective amount of the β-lactone of 2,2,4-trimethyl-3-hydroxy-3-pentenoic acid.

2. The method of claim 1 in which the β-lactone of 2,2,4-trimethyl-3-hydroxy-3-pentenoic acid is employed in vapor phase.

3. The method of claim 1 in which the microorganisms which are treated are bacteria.

4. The method of claim 3 in which the bacteria are *Staphylococcus aureus.*

5. The method of claim 4 in which the β-lactone of 2,2,4-trimethyl-3-hydroxy-3-pentenoic acid is employed in vapor phase.

References Cited

UNITED STATES PATENTS

| | | | |
|---|---|---|---|
| 3,062,836 | 11/1962 | Martin | 260—343.9 |
| 3,062,837 | 11/1962 | Clark | 260—343.9 |

ALBERT T. MEYERS, *Primary Examiner.*

S. ROSEN, *Examiner.*

J. GOLDBERG, *Assistant Examiner.*